(12) United States Patent
Saito et al.

(10) Patent No.: US 6,383,014 B1
(45) Date of Patent: May 7, 2002

(54) WIRE HOLDING STRUCTURE OF AN ELECTRIC WIRE PROTECTOR

(75) Inventors: Satoshi Saito; Tomohiro Ikeda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/695,943

(22) Filed: Oct. 26, 2000

(30) Foreign Application Priority Data

Oct. 29, 1999 (JP) .......................................... 11-308918

(51) Int. Cl.$^7$ ................................................ H01R 13/58
(52) U.S. Cl. ........................................ 439/456; 174/97
(58) Field of Search ........................ 439/456; 174/68.1, 174/68.3, 72 A, 97; 52/712; 361/826

(56) References Cited

U.S. PATENT DOCUMENTS

| | | | | |
|---|---|---|---|---|
| 3,471,629 A | * | 10/1969 | O'Leary ....................... | 174/49 |
| 5,161,580 A | * | 11/1992 | Long ........................... | 138/92 |
| 5,534,665 A | * | 7/1996 | Long ........................... | 174/72 A |
| 5,668,910 A | * | 9/1997 | Arnett ......................... | 385/134 |
| 5,929,380 A | * | 7/1999 | Carlson, Jr. et al. ....... | 174/68.3 |

FOREIGN PATENT DOCUMENTS

| | | |
|---|---|---|
| JP | 06-21317 | 3/1994 |
| JP | 11-120986 | 4/1999 |
| JP | 2000-123802 | 4/2000 |

* cited by examiner

*Primary Examiner*—Tulsidas Patel
(74) *Attorney, Agent, or Firm*—Armstrong, Westerman & Hattori, LLP

(57) ABSTRACT

A wire holding structure of an electric wire protector is provided, which includes: a protector body having two or more wire putting-through portions, at least one of the wire putting-through portions crossing the other thereof and forming at least one cross portion; a cover to cover the protector body; and a wire to be arranged inside the protector body, wherein a nail for preventing protrusion of the wire projects inward from the cross portion. The nail may be replaced with a pin projecting upward from a top of the cross portion. A wire separating rib may be provided on a bottom wall of each of the wire putting-through portions with a space between an end of the wire separating rib and the cross portion. And, the electric wire protector in a state of accommodating the wire is insert-molded in resin and forms a part of a battery connection plate.

8 Claims, 10 Drawing Sheets

WIRE HOLDING STRUCTURE OF AN ELECTRIC WIRE PROTECTOR

BACKGROUND OF THE INVENTION

1. Field of the Invention

The present invention relates to a wire holding structure of an electric wire protector, wherein the electric wire is prevented from protruding from a protector body through which the electric wire is put.

2. Description of the Related Art

FIG. 7 shows a conventional electric wire protector in use for protection of a wiring harness.

This electric wire protector 51 consists of a gutter-like protector body 52 of synthetic resin in a crank shape and a cover 53 of synthetic resin to cover a top opening of the protector body 52.

The wires 54 are arranged inside the protector body 52, the cover 53 is engaged with the protector body 52 by a set of engaging means 55,56, and the wire 54 is protected from the outside. This electric wire protector 51 is used for such a place as a portion under a vehicle floor which is likely to receive strong external force.

With respect to the electric wire protector 51, however, the wire 54 is likely to rise or protrude over a sidewall 58 of the protector body 52 at a bent portion (i.e. a cross portion) 57 when tensile force acted on the wire 54, as shown in FIGS. 8A, 8B.

And, this requires. an additional work of putting the wire 54 inside the protector body 52; that is, this requires troublesome work and causes poor workability. And, since the wire 54 would not be settled, length of the wire 54 could not be decided. Further, if the cover 53 (FIG. 7) is put on and tightened, the wire 54 would be damaged.

On the other hand, FIG. 9 shows another prior art electric wire protector, which is used for a battery connection plate for an electric vehicle, disclosed in Japanese Patent Application Laid-open No. 11-120986. This electric wire protector 61 is formed by insert-molding a plurality of wires 62 in resin, i.e. a resin body 63.

This electric wire protector 61 consists of a central main portion 64 and a plurality of branch portions 65 on both sides of the main portion 64. The wires (the mains) 62 are gathered and led out from the resin body 65. A terminal 66 is pressure-welded to the end portion of the wire (the branch) 62 at a branch portion 63, and an electrically contacting portion 67, in a generally square plate, of the terminal 66 is exposed to the outside of the resin body 63. A fuse connecting portion of the terminal 66 is exposed inside a frame portion 68 of the resin body 63.

A fuse (not shown) is to be connected to the fuse connecting portion, and therefore the electrically contacting portion 67 is connected to the wire 62 through the fuse. One electrode 70 of a battery 69 (FIG. 11) is inserted into the electrically contacting portion 67, and the wire 62 is connected to a voltage detector (not shown).

FIG. 10 shows a battery connection plate 72 which is formed by insert-molding the electric wire protector 61 (FIG. 9) inside a second resin body 71. The wires (the main portions) 62 are led out from one end of a plate body, i.e. the resin body 71. Before the above insert-molding, a busbar 90 of conductive metal in a rectangular shape is connected to the electrically contacting portion 67 of the voltage-detective terminal 66 (FIG. 9).

Two holes 73 are provided on the busbar 90, and a male-threaded electrode 70 of each battery 69 (FIG. 11) is inserted into each of the holes 73 and screwed with a nut (not shown). By means of the busbar 90, two neighboring batteries 69 are connected in series. The electrically contacting portion 67 of the above terminal 66 (FIG. 9) is connected to one hole 73 of the busbar 90 with the nut. Another busbar 74 having one hole is arranged on an end side of the battery connection plate 72, and an electric wire for power feeding (not shown) is connected to the busbar 74.

Referring to FIG. 11, the above battery connection plate 72 is connected to the electrode 70 of the cylindrical battery 69, and another battery connection plate 75 is connected to the other electrode 76 of the battery 69.

The battery connection plates 72,75 are tightly-connected to the electrodes 70,76 with nuts in a state of the battery 69 being set inside a holder 78 having a plurality of circular holes 77. The holder 78 is fixed to a vehicle body with bracket 79, bolts 80, or the like. The terminals 66 are arranged on the battery connection plate 72, and the wires 62 continuing from the terminals 66 are led out to the outside.

However, with respect to the above conventional electric wire protector 61 (FIG. 9), when the wires 62 are insert-molded inside the resin body 65, positioning work of the wires 62 is troublesome. And, since the wires 62 are immersed in hot resin during the insert-molding, a measure for heat shall be taken on the insulative covers of the wires 62, thereby increasing the cost.

On account of the above, Japanese Patent Application Laid-open No. 2000-123802 discloses an electric wire protector wherein a cover made of synthetic resin is closed to secure the wires (not shown) after the wires have arranged inside the protector body.

With respect to this electric wire protector, however, since the wires 62 are arranged flat in parallel each other similarly to the electric wire protector 61 of FIG. 9, the electric wire protector is relatively flat, and therefore, similarly to the electric wire protector 51 of FIG. 7, the wires are likely to rise at a bent portion (i.e. a cross portion) of the protector body during the arrangement work of thereof, whereby the wires are likely to protrude to the outside over the sidewall of the protector body.

This causes poor workability for wiring. And, if the cover is put on and tightened, the wires would be damaged. Further, when the electric wire protector is covered with a resin material 71 as shown in FIG. 10, the protruded portions of the wires are immersed in a hot condition. Still further, since strong tensile force cannot be given to the wires, the wires could not be arranged in order around the cross portion of the protector body, thereby length of the wires can not be settled.

SUMMARY OF THE INVENTION

In view of the foregoing, an object of the present invention is to provide a wire holding structure of an electric wire protector, wherein protrusion of the wires from the cross portion of the electric wire protector is prevented securely, arrangement workability of the wires is improved, damage of the wires can be prevented, and length of the wires can be pre-settled.

In order to achieve the above object, as a first aspect of the present invention, a wire holding structure of an electric wire protector comprises: a protector body having two or more wire putting-through portions, at least one of the wire putting-through portions crossing the other thereof and forming at least one cross portion; a cover to cover the protector body; and a wire to be arranged inside the protector body, wherein a nail for preventing protrusion of the wire projects inward from the cross portion.

As a second aspect of the present invention, a wire holding structure of an electric wire protector comprises: a protector body having two or more wire putting-through portions, at least one of the wire putting-through portions crossing the other thereof and forming at least one cross portion; a cover to cover the protector body; and a wire to be arranged inside the protector body, wherein a pin for preventing protrusion of the wire projects upward from a top of the cross portion.

As a third aspect of the present invention, in the structure with the above first or second aspect, a wire separating rib stands from a bottom wall of each of the wire putting-through portions with a space between an end of the wire separating rib and the cross portion.

As a fourth aspect of the present invention, in the structure with any one of the above aspects, the electric wire protector in a state of accommodating the wire is insert-molded in resin, the electric wire protector being capable of forming a part of a battery connection plate.

According to the above-described structures of the present invention, the following advantages are provided.

(1) Since protrusion of the wire from the cross portion of the protector body is securely prevented by the nail, arrangement workability of the wire is improved and also damage of the wire by the cover can be prevented. And, since the wire can be pulled so that the wire comes into close contact with a wall surface of the cross portion, arranging length of the wire can be pre-settled while preventing the slack of the wire, thereby improving arrangement workability of the wire and also preventing damage of the wire by the cover.

(2) Since the wire is caught on the pin even if the wire rises at the cross portion of the protector body, protrusion of the wire can be prevented, thereby improving arrangement workability of the wire and also preventing damage of the wire by the cover. And, since the wire can be pulled so that the wire comes into close contact with a wall surface of the cross portion, arranging length of the wire can be p-resettled while preventing the slack of the wire. Further, the wire being caught on the pin is pushed by the cover, which improves the workability.

(3) Since the wire is separated one by one by the ribs in the protector body, the wires can be arranged flat in parallel in good order. And, since the end portions of the respective ribs leave respective spaces to respective cross portions, the wire can be pulled so that the wire comes into close contact with a wall surface of the cross portion, arranging length of the wire can be pre-settled while preventing the slack of the wire, thereby preventing damage of the wire by the cover.

(4) Since the electric wire protector is integrally insert-molded in resin, thickness of the battery connection plate can be reduced.

The above and other objects and features of the present invention will become more apparent from the following description taken in conjunction with the accompanying drawings.

DESCRIPTION OF THE PREFERRED EMBODIMENT(S)

Embodiments of the present invention will now be described in further detail with reference to the accompanying drawings.

Figure 1:
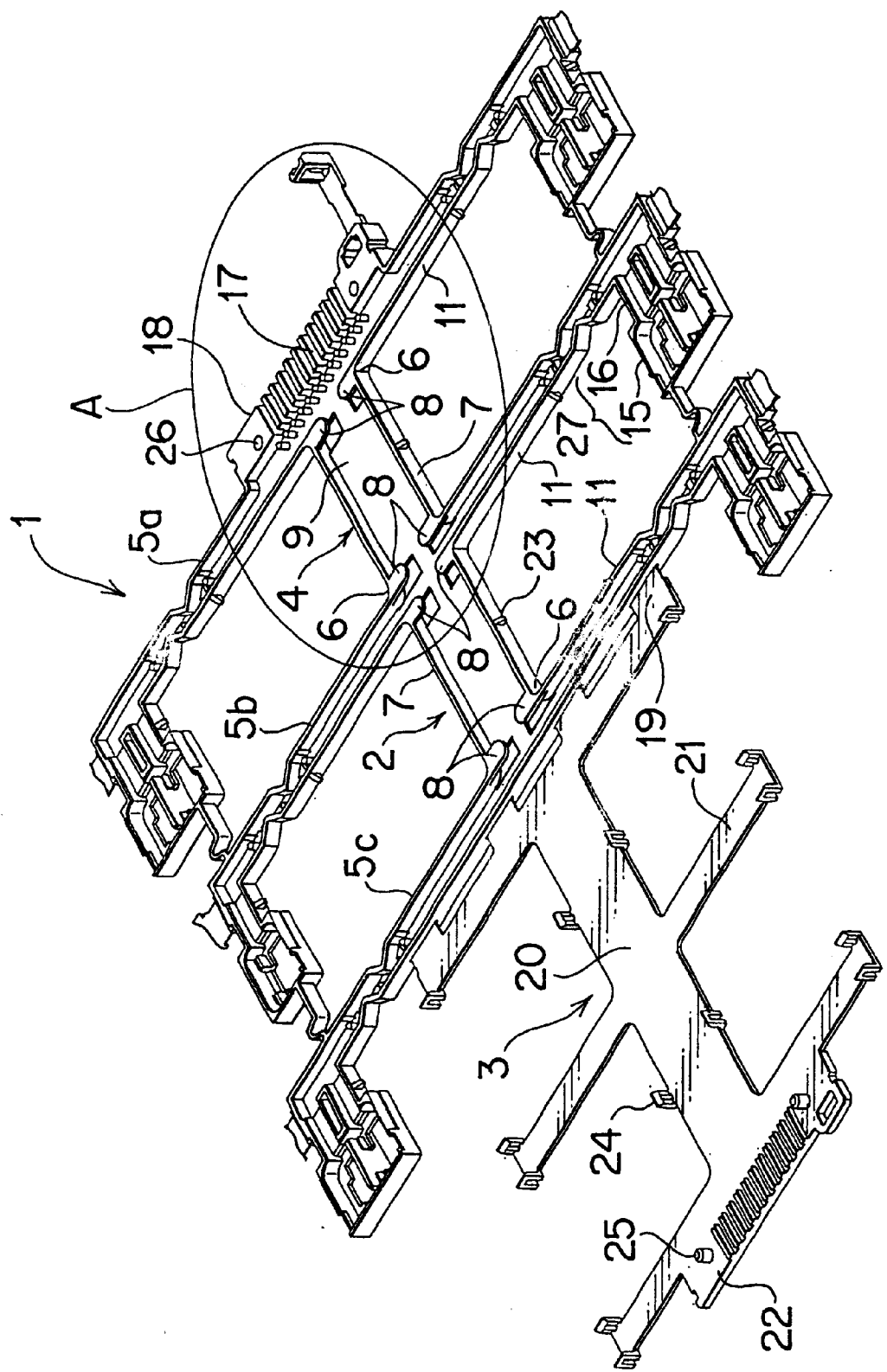
FIG. 1 is a perspective view showing an embodiment of a wire holding structure of an electric wire protector in accordance with the present invention.
Figure 2:
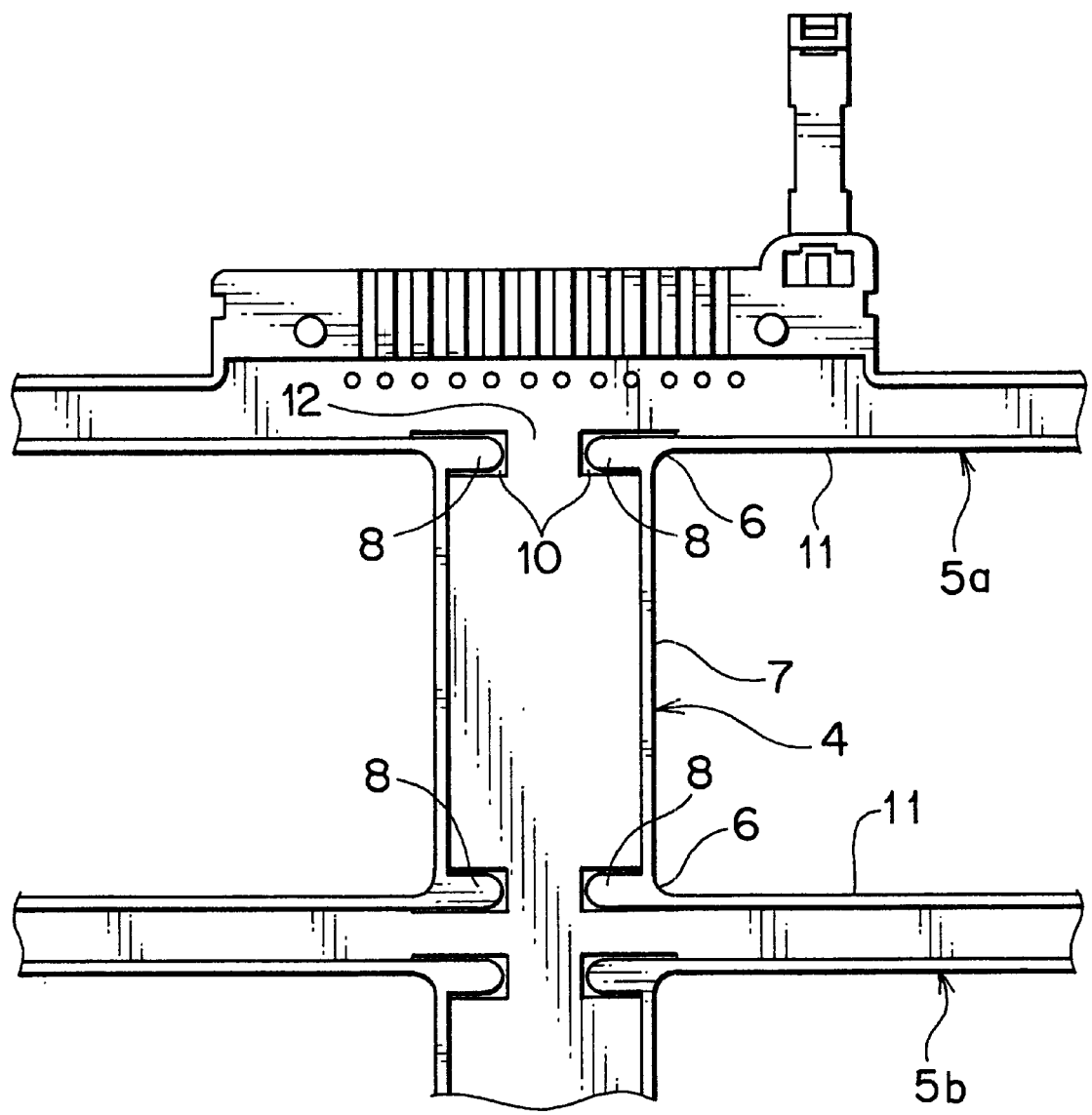
FIG. 2 is an enlarged plan view of A-portion of FIG. 1.

FIGS. 1–2 show an embodiment of a wire holding structure of an electric wire protector in accordance with the present invention.

The wire holding structure of an electric wire protector 1 is characterized in that, in the vicinity of each cross portion 6 (i.e. a bent portion) of a wide main wire putting-through portion (i.e. a wire putting-through portion) 4 and each of narrow branch wire putting-through portions (i.e. wire putting-through portions) 5a–5c of a protector body 2 made of synthetic resin, a wire rise-preventive (i.e. a wire protrusion-preventive) inwardly-facing nail 8 is formed in parallel with a bottom wall 9 of the main wire putting-through portion 4 from the upper end of each wall portion (i.e. a sidewall) 7 of the main wire putting-through portion 4.

The nail 8 is integrally formed with the sidewall 7 of the protector body 2 and is arranged oppositely to each other on both sides of the main wire putting-through portion 4. A hole 10 (FIG. 2) required for resin-molding the nail 8 is formed on the bottom wall 9 of the protector body 2.

As shown in FIG. 2, each nail 8 extends straight from a sidewall 11 of the branch wire putting-through portion. Between a pair of nails 8 facing each other provided is a gap 12 having almost the same length as of the nail 8.

An upper end surface of each of the nails 8 is in the same plane as of upper end surfaces of the wall portions 7, 11. Thickness of the nail 8 is thinly set in a degree that the nail 8 does not obstacle insertion of a wire 13 (FIG. 3), and the nail 8 has resilience in a thickness direction. Length of the nail 8 is decided according to the number of wires. The end of the nail 8 is formed in a circular-arc not to damage the wire 13.

Figure 6:
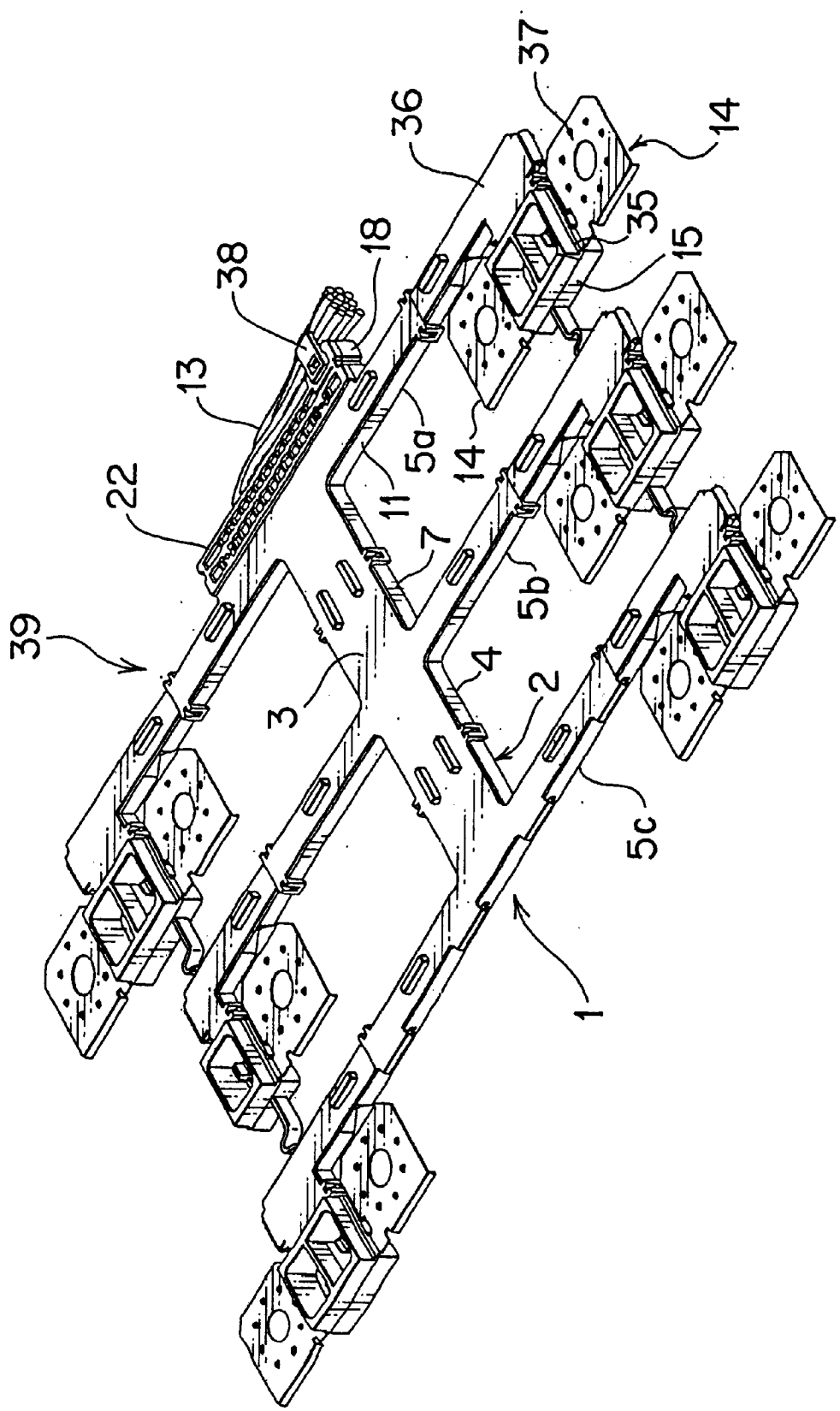
FIG. 6 is a perspective view showing an assembled state of the electric wire protector.
Figure 7:
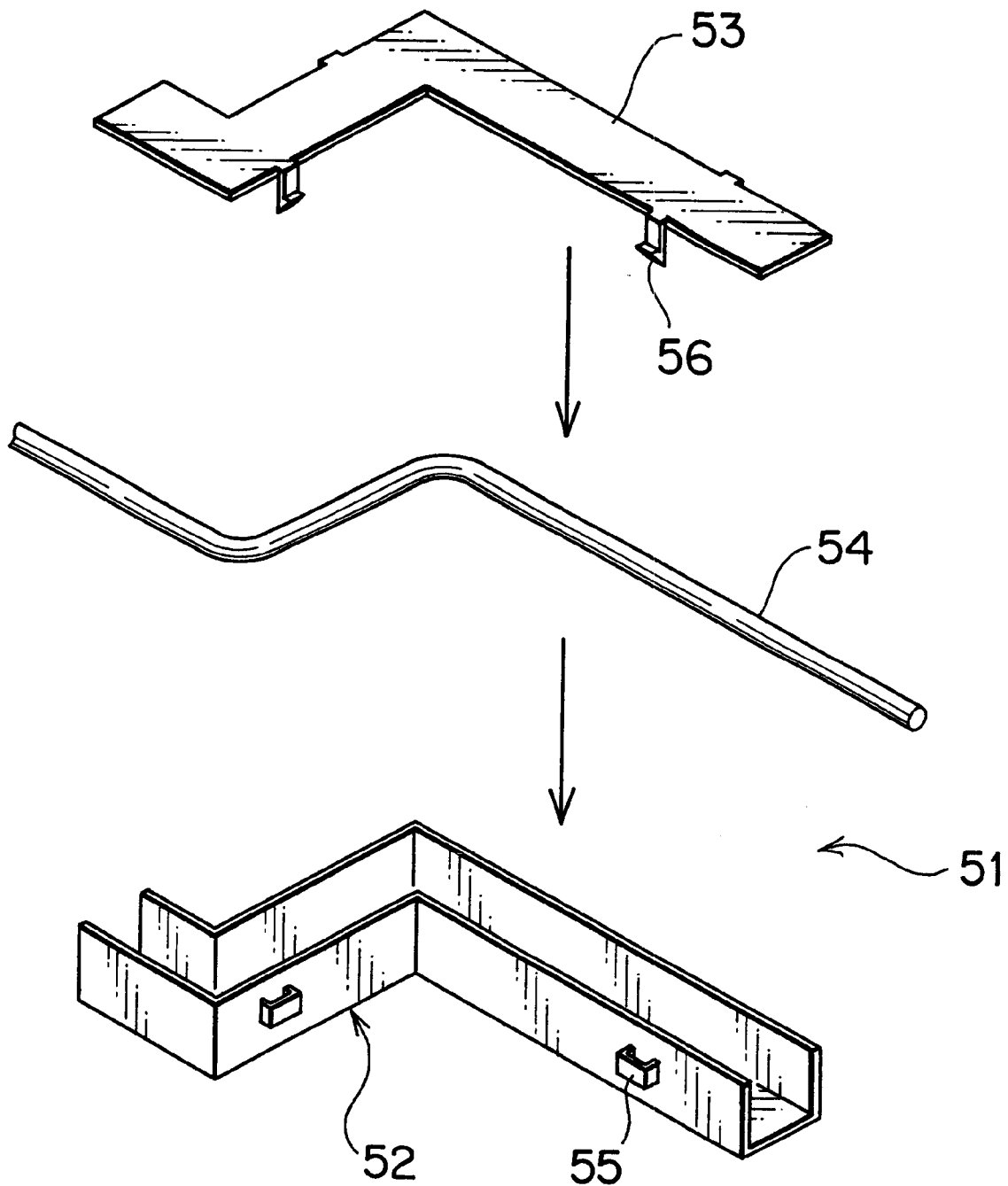
FIG. 7 is an exploded perspective view showing a prior art electric wire protector.
Figure 8A:
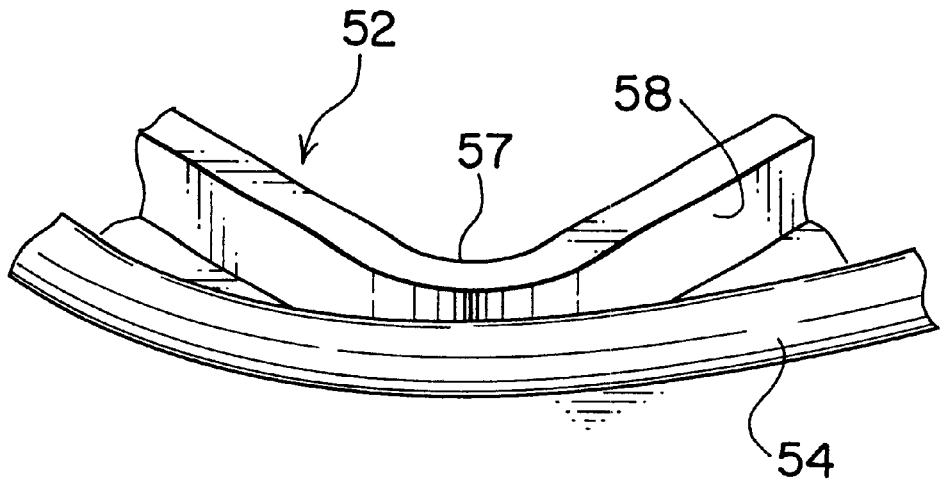
FIG. 8A is a perspective view showing an unproperly arranged state of a wire at a corner portion of the electric wire protector of FIG. 7.
Figure 8B:
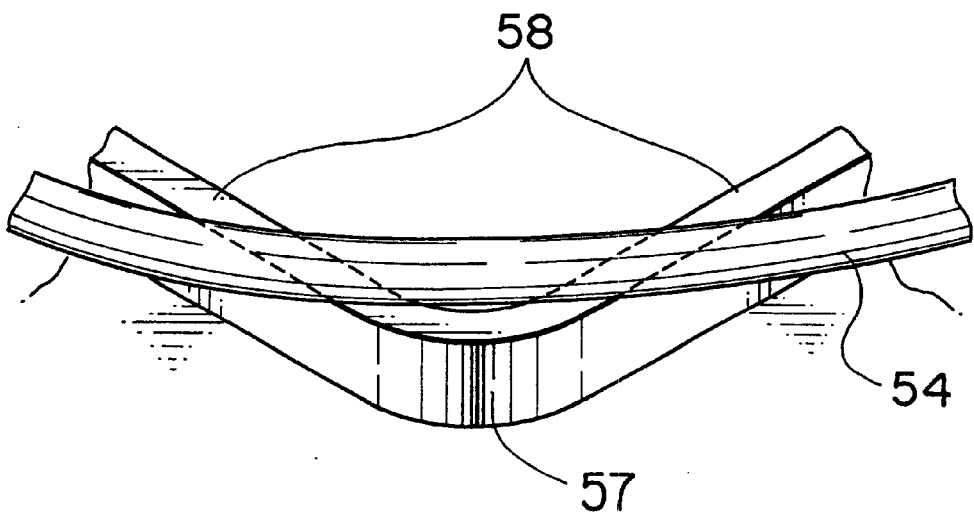
FIG. 8B is a perspective view showing another unproperly arranged state of a wire at a corner portion of the electric wire protector of FIG. 7.
Figure 9:
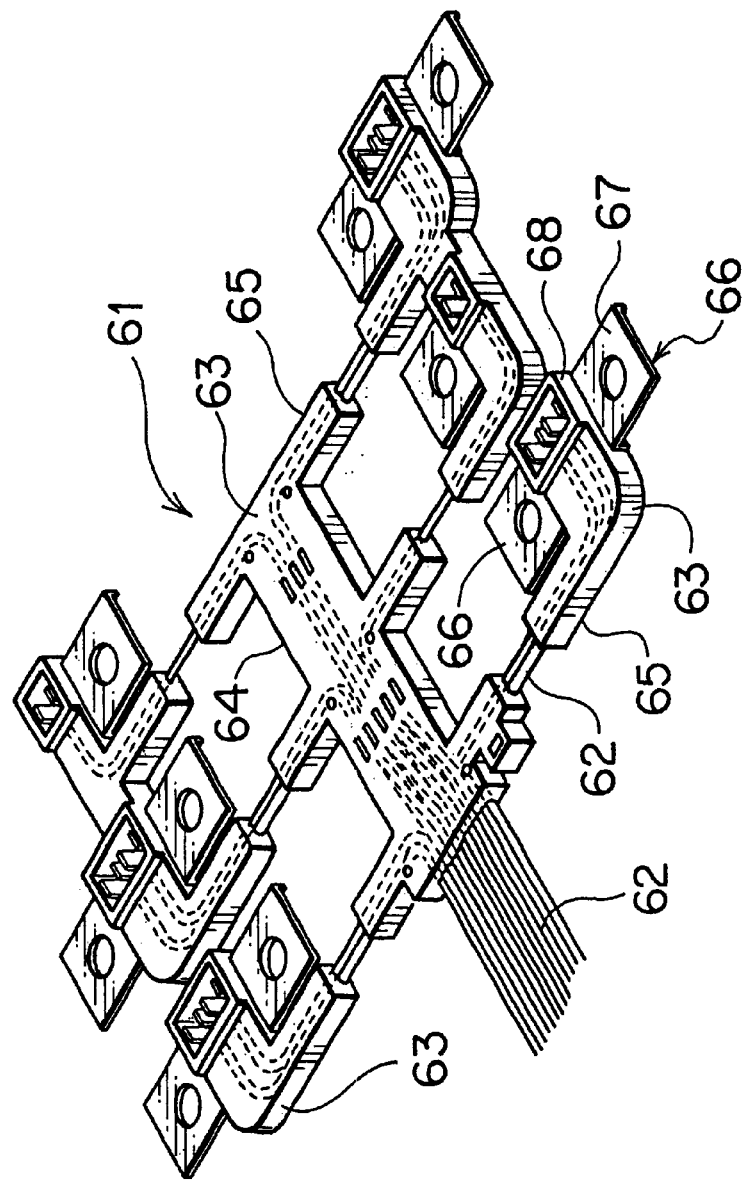
FIG. 9 is a perspective view showing another prior art electric wire protector.
Figure 10:
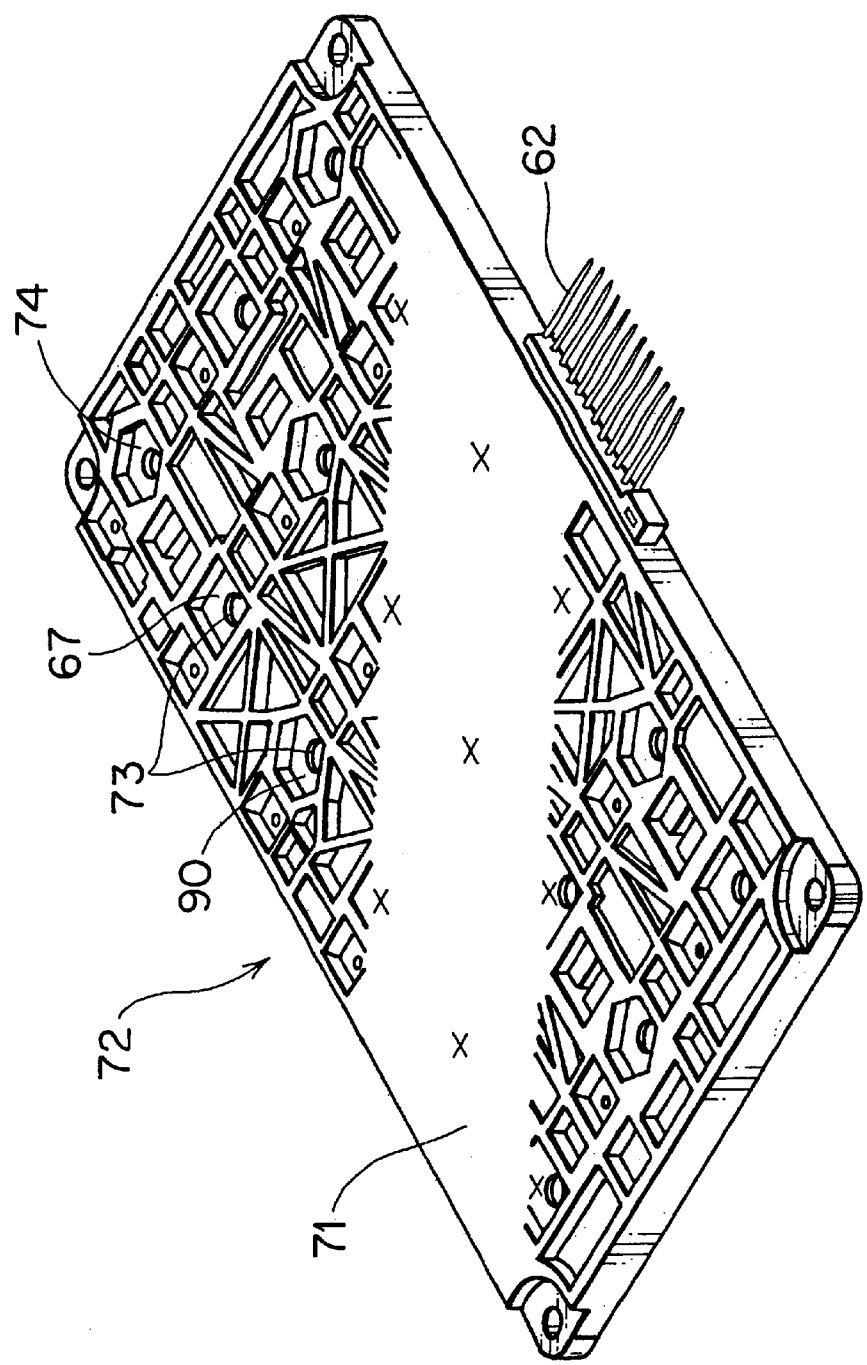
FIG. 10 is a perspective view showing a battery connection plate using the electric wire protector of FIG. 9.

As shown in FIG. 1, in the present embodiment three branch wire putting-through portions 5a–5c cross at right angles with the main wire putting-through portion 4. The nail 8 is preferably provided at all the cross portions 6 as shown in FIG. 1. At an end side of each of the branch wire putting-through portions 5a–5c provided is a frame portion 15 to accommodate a fuse connecting portion (not shown) of a voltage-detective terminal 14 (FIG. 6). A gutter portion 16 to accommodate a wire pressure-welding portion (not shown) of the terminal 14 is formed adjacently to the frame portion 15. The structure except the nail 8 is almost the same as of Japanese Patent Application Laid-open No. 2000-123802.

On the branch wire putting-through portion 5a provided at the front end of the main wire putting-through portion 4, a wire leading-out portion 18 having a plurality of parallel grooves 17 for leading-out the wires projects forward. And, a cover 3 made of synthetic resin is integrally formed on the rear branch wire putting-through portion 5c through a thin hinge portion 19.

The cover 3 has a wide portion 20 to cover the main wire putting-through portion 4, narrow portions 21 to cover the branch wire putting-through portions 5a–5c, and a brim portion 22 to cover the wire leading-out portion 18. An engaging projection 23 is provided on an outside surface of each of the sidewalls 7,11 of the protector body 2, and an engaging framelet 24 for the engaging projection 23 is provided on corresponding portions of the cover 3. A positioning pin 25 is provided on the brim portion 22, and an engaging hole 26 for the positioning pin 25 is provided on the wire leading-out portion 18.

Figure 3:
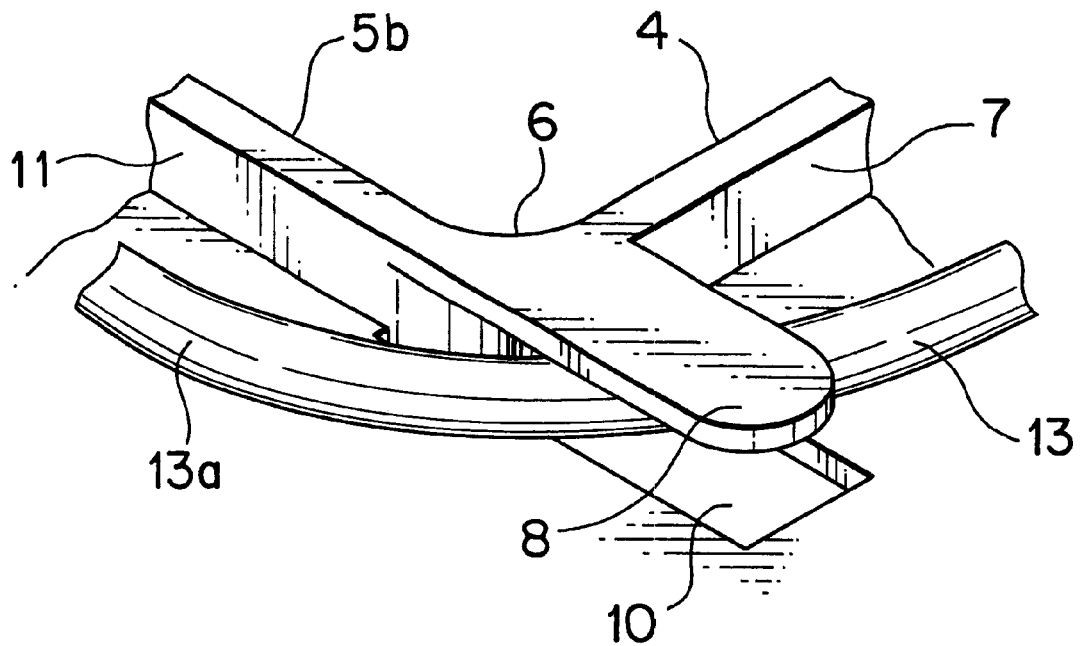
FIG. 3 is a perspective view showing work of a wire-holding nail.

In a state that the wire 13 (FIG. 3) is pressure-welded to the voltage-detective terminal 14 (FIG. 6), the terminal 14 is accommodated in an accommodating portion 27 (FIG. 1) and the wires 13 are led out from the wire the leading-out portion 18 to the outside the respective branch wire putting-through portions 5a–5c and then through the main wire putting-through portion 4. At this time, as shown in FIG. 3, the wires 13 are arranged under the respective nails 8, whereby rise or protrusion of the wires 13 can be securely prevented. Therefore, arrangement workability of the wires 13 is improved and damage of the wires 13 by the cover 3 (FIG. 1) can be prevented.

And, since protrusion of the wires 13 is prevented by the nails 8 even if the wire 13 is pulled, the wires 13, especially the branches, can be strongly drawn out in arrangement work thereof and can be cohere to inner walls of the cross portions 6 of the protector body 2. Therefore, since position of the wires 13 at the respective cross portions 6 can be fixed, arranging length of each of the wires 13 can be settled.

And, since the cover 3 (FIG. 1) is supported with the nails 8 in addition to the sidewalls 7, 11, the electric wire protector 1 is strengthened.

Figure 4:
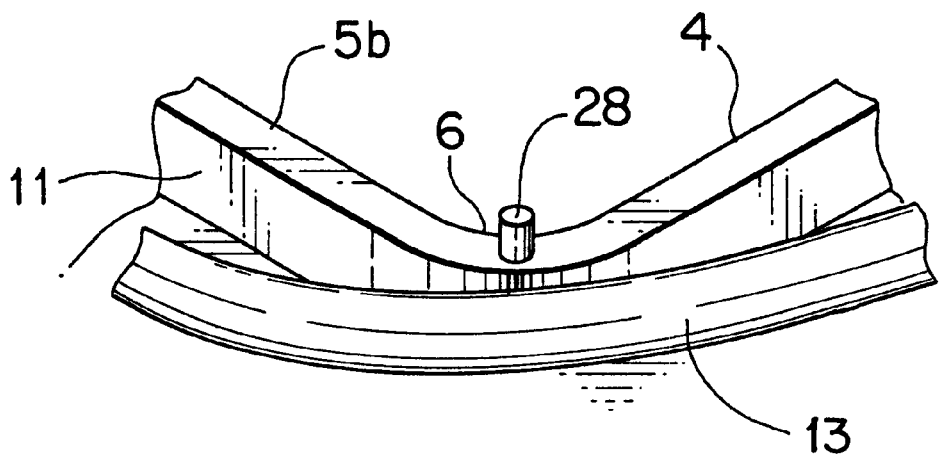
FIG. 4 is a perspective view showing an embodiment of a wire holding structure having a pin.

On the other hand, as shown in FIG. 4, a cylindrical pin 28 in place of each of the nails 8 is effective in preventing protrusion of the wires 13. The pin 28 projects upward over the top surface of the cross portion 6.

The pin 28 is formed integrally with the cross portion 6. Even if the wire 13 would rise and horizontally hangs on the pin 28, the wire 13 is pushed by the cover 3 and is accommodated inside the protector body 2 on closing the cover 3 (FIG. 1). Therefore, some surface of the pin 28 preferably continues from the inside surface of each of the sidewalls 7,11.

Circular engaging holes (not shown) for receiving the respective pins 28 are provided on the cover 3. This engaging hole is fairly small and can be used for positioning the cover 3. With use of the pin 28 instead of the nail 8 (FIG. 3), the space inside the main wire putting-through portion 4 is effectively used, and therefore the number of wires being put in the portion 4 increases.

Figure 5:
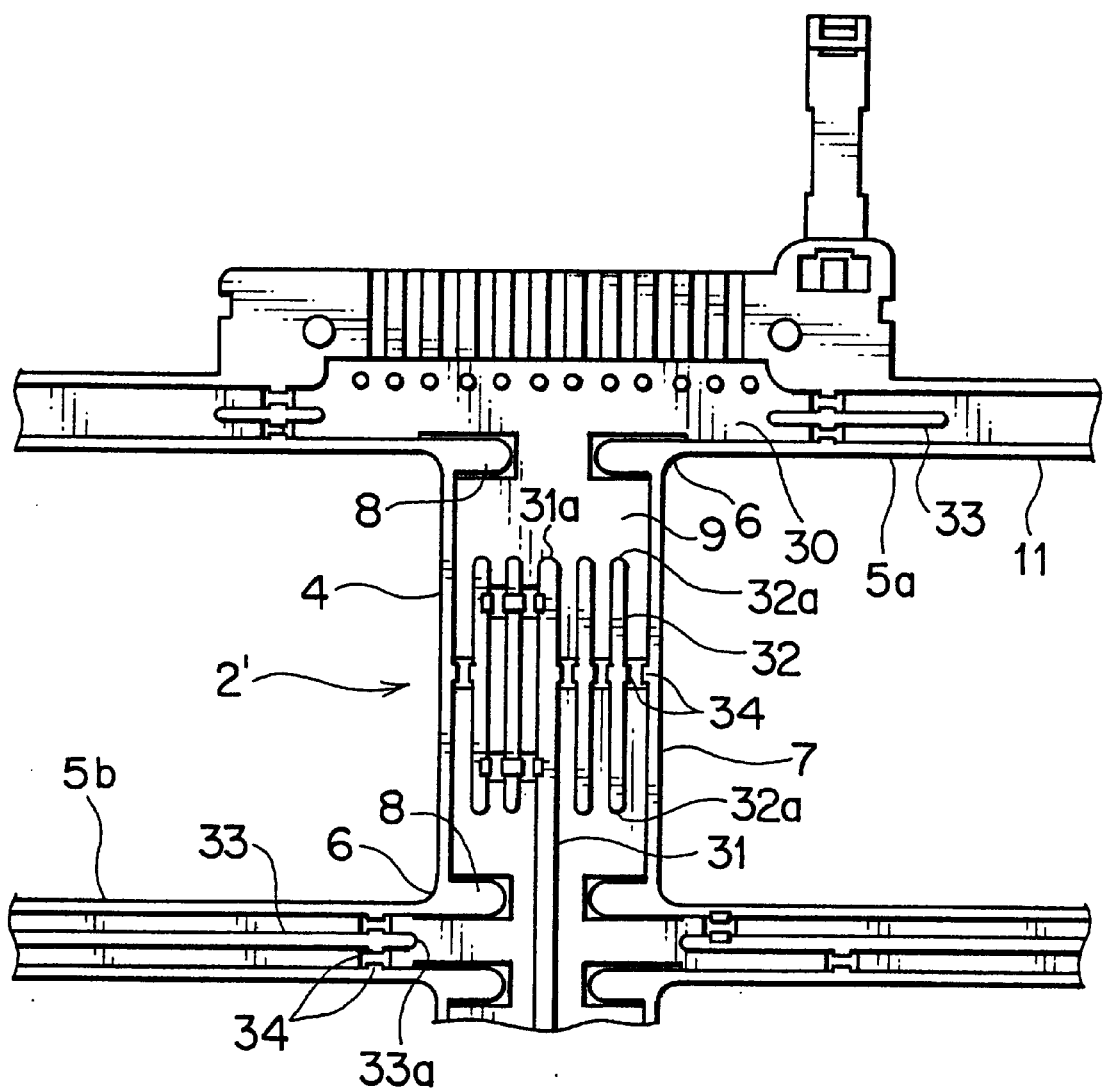
FIG. 5 is a plan view showing an embodiment of a wire holding structure wherein ribs are formed for separating wires.

FIG. 5 shows an embodiment including ribs 31–33 for separating wires, which ribs stand on the bottom walls 9, 30 of a protector body 2'. The same reference characters are applied to the same portions of the embodiment shown in FIG. 2.

A long rib 31 is formed in almost the center of a main wire putting-through portion (i.e. a wire putting-through portion) 4 in a longitudinal direction thereof, and short ribs 32 are arranged on both sides of the rib 31 in parallel. A rib 33 stands on in almost the center of each of branch wire putting-through portions (i.e. wire putting-through portions) 5a, 5b, and at least one wire can be put aside the rib 33.

The end portions 31a–33a of the respective ribs 31–33 leave respective spaces to respective cross portions 6 as shown; With this configuration, the wires in the main wire putting-through portion 4 can go under the nails 8 and along the cross portions 6, whereby the wires can be arranged without protrusion and with pre-settled length.

Each space between the ribs 32, 33 and the sidewalls 7, 11 receives a single wire, whereby lap of the wires can be prevented, which is effective in preventing protrusion of wire.

A projection 34 for holding the wire is provided, facing each other, on each of the ribs 31–33 and the sidewalls 7,11. The structure including the ribs 31–33 having the projection 34 is applicable to the protector body having the nail 8 and also to the protector body having the pin 28 shown in FIG. 4.

FIG. 6 shows the protector body 2 which is covered after the wires 13 have been accommodated therein. Almost all the portions of the main wire putting-through portion 4 and the branch wire putting-through portions 5a–5c are covered with the cover 3, and the end portions of the branch wire putting-through portions 5a–5c are covered with subcovers 36 (FIG. 6). The electrically contacting portion 37, in a four-sided figure, of the voltage-detective terminal 14 is arranged on both sides of the frame portion 15.The wires 13 are led out from the leading-out portion 18 and fixed with a band 38 to the leading-out portion 18. A connector to be connected to a voltage detector (not shown) is provided at the ends of the wires 13.

The battery connection plate is completed by insert-molding the electric wire protector assembly 39 of FIG. 6 in resin.

Figure 11:
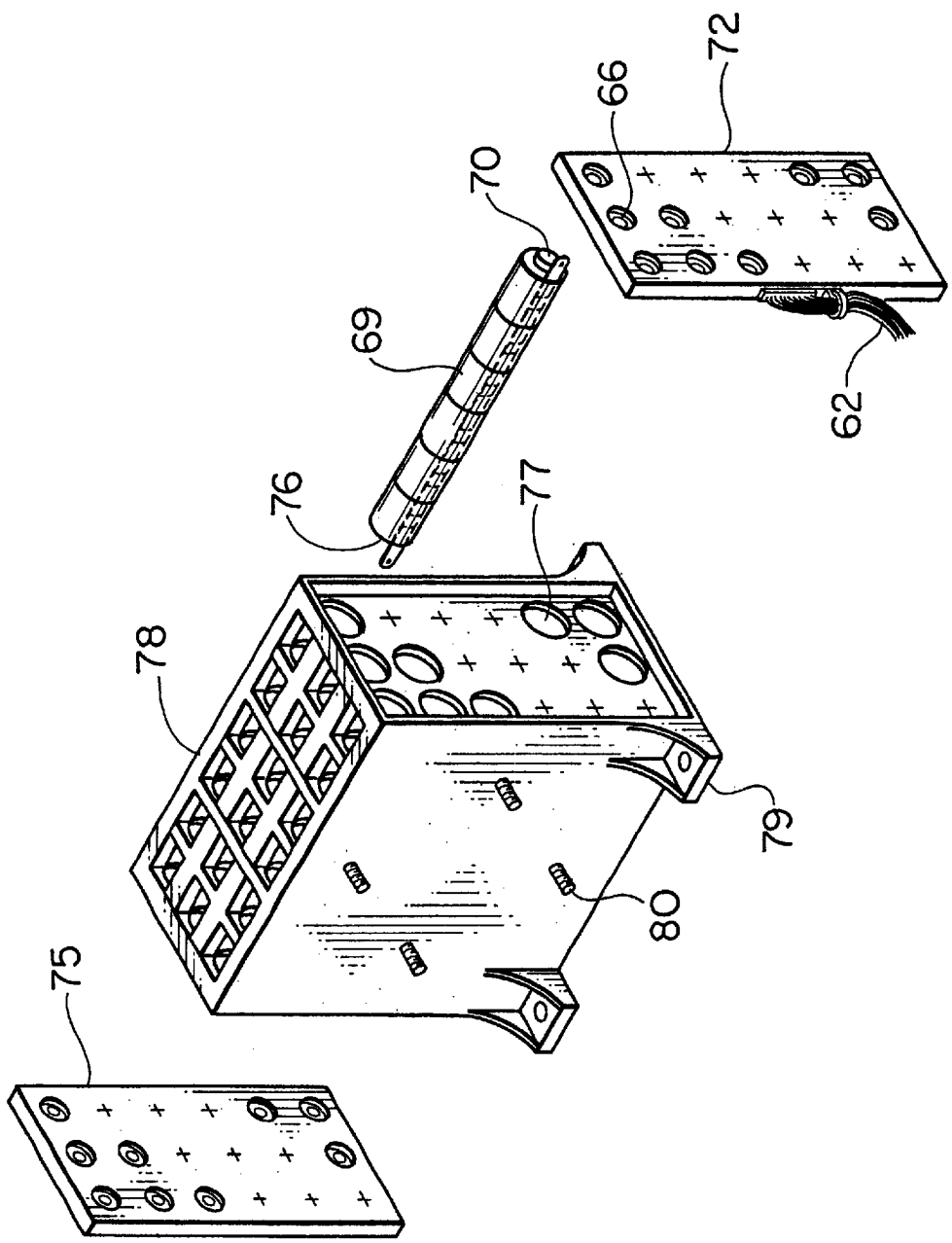
FIG. 11 is an exploded perspective view showing a usage of the battery connection plate of FIG. 10.

Since protrusion of the wire 13 can be prevented by means of the nail 8 (FIG. 1) or the pin 28 (FIG. 4) even if height of the sidewalls 7,11 of the protector body 2 is fairly low, the electric wire protector 1 can be formed flat. Accordingly, when the above structure is applied to the electric wire protector 1 for the battery connection plate, thickness of the battery connection plate can be reduced, thereby downsizing the battery connection unit (FIG. 11).

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wire holding structure of an electric wire protector, comprising:
    a protector body having first and second wire conducting portions, each being formed by a bottom wall having oppositely-spaced sidewalls upstanding from the bottom wall, the second wire conducting portion being narrower than the first wire conducting portion, crossing the first wire conducting portion and forming a cross portion;

a cover to close the first and second wire conducting portions of the protector body; and at least one pair of wire-engaging arms disposed at the cross portion for preventing release of a wire disposed in said cross portion, said pair of wire-engaging arms facing each other, being substantially parallel to said second wire conducting portion, and each forming a substantially coplanar longitudinal extension from a top of a sidewall of said second wire conducting portion.

2. A wire holding structure of an electric wire protector, comprising:

a protector body having first and second wire conducting portions, each being formed by a bottom wall having oppositely-spaced sidewalls upstanding from the bottom wall, the second wire conducting portion being narrower than the first wire conducting portion, crossing the first wire conducting portion and forming a cross portion;

a cover to close the first and second wire conducting portions of the protector body; and at least one pair of pins disposed across the first wire conducting portion for preventing release of a wire from the cross portion, each pin projecting vertically upward from a top of an intersection of said sidewalls at the cross portion.

3. The wire holding structure as set forth in claim 1, wherein a wire separating rib stands from a bottom wall of each of the wire conducting portions with a space between an end of the wire separating rib and the cross portions.

4. The wire holding structure as set forth in claim 2, wherein a wire separating rib stands from a bottom wall of each of the wire conducting portions with a space between an end of the wire separating rib and the cross portion.

5. The wire holding structure as set forth in claim 1, wherein the electric wire protector in a state of accommodating the wire is insert-molded in resin, the electric wire protector being capable of forming a part of a battery connection plate.

6. The wire holding structure as set forth in claim 2, wherein the electric wire protector in a state of accommodating the wire is insert-molded in resin, the electric wire protector being capable of forming a part of a battery connection plate.

7. The wire holding structure as set forth in claim 3, wherein the electric wire protector in a state of accommodating the wire is insert-molded in resin, the electric wire protector being capable of forming a part of a battery connection plate.

8. The wire holding structure as set forth in claim 4, wherein the electric wire protector in a state of accommodating the wire is insert-molded in resin, the electric wire protector being capable of forming a part of a battery connection plate.

\* \* \* \* \*